L. T. HERBOLD, Jr.
ATTACHMENT FOR MILK PAILS.
APPLICATION FILED AUG. 9, 1910.

985,030.

Patented Feb. 21, 1911.

2 SHEETS—SHEET 1.

Witnesses
Wm. C. Fielding
Henry T. Bright

Inventor
LOUIS T. HERBOLD, JR.

By Chandler & Chandler
Attorneys

L. T. HERBOLD, Jr.
ATTACHMENT FOR MILK PAILS.
APPLICATION FILED AUG. 9, 1910.
985,030.
Patented Feb. 21, 1911.
2 SHEETS—SHEET 2.
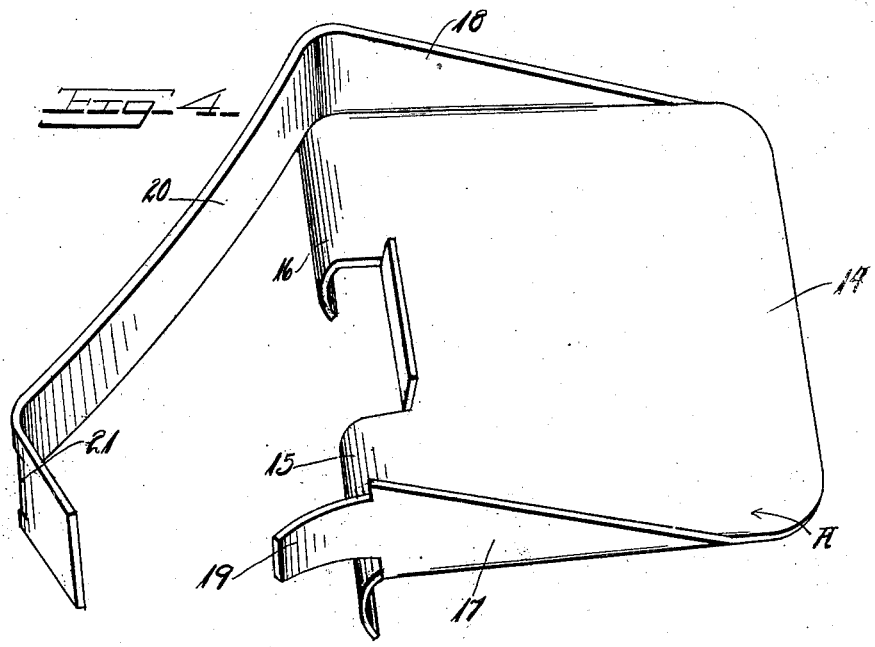
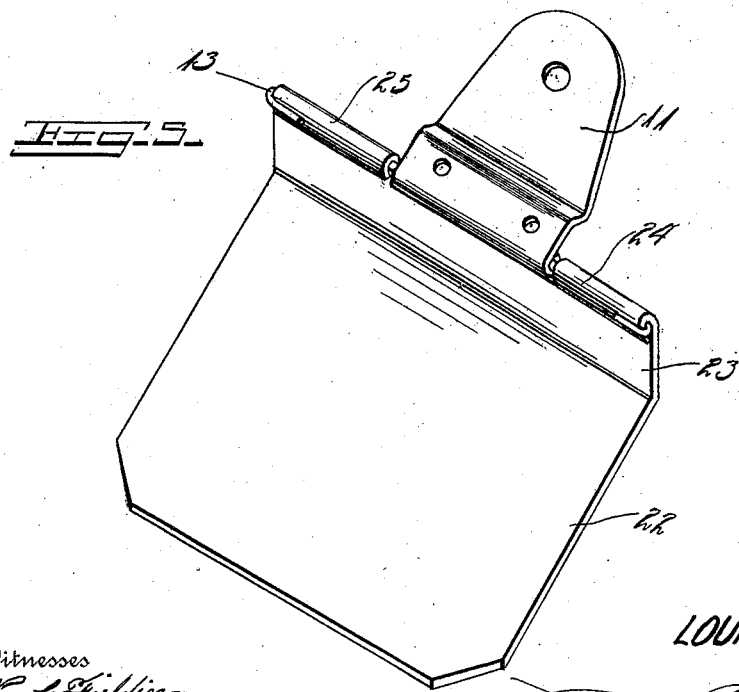
Witnesses
Wm. C. Fielding
Henry T. Bright
Inventor
LOUIS T. HERBOLD, JR.
By
Attorney

UNITED STATES PATENT OFFICE.

LOUIS T. HERBOLD, JR., OF NEWTON, IOWA.

ATTACHMENT FOR MILK-PAILS.

985,030.　　　　　　　Specification of Letters Patent.　　Patented Feb. 21, 1911.

Application filed August 9, 1910. Serial No. 576,365.

*To all whom it may concern:*

Be it known that I, LOUIS T. HERBOLD, Jr., a citizen of the United States, residing at Newton, in the county of Jasper, State of Iowa, have invented certain new and useful Improvements in Attachments for Milk-Pails; and I do hereby declare the following to be a full, clear, and exact description of the invention, such as will enable others skilled in the art to which it appertains to make and use the same.

This invention relates to attachments for milk pails.

The object of the invention resides in the construction of an attachment of the character named through the instrumentality of which a milk pail may be easily and comfortably supported between the knees during the operation of milking.

Another object of the invention is to so construct and associate the appliances with the pail that when the former are not in use they will be disposed close to the sides of the pail.

With these objects in view the invention consists in the details of construction and in the arrangement and combination of parts as will be hereinafter more fully described and particularly pointed out in the appended claim.

Figure 1:
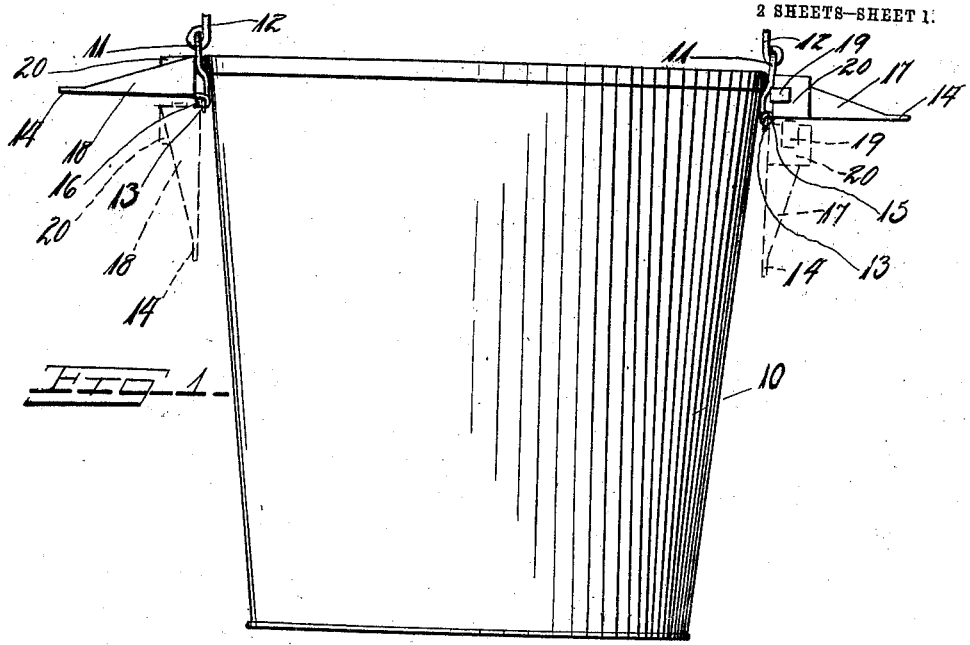
Figure 2:
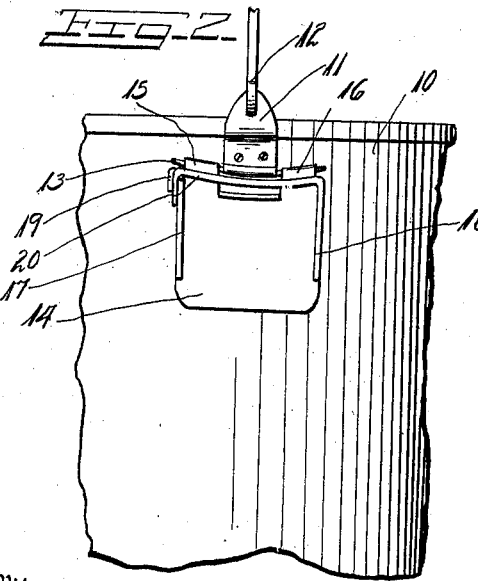
Figure 3:
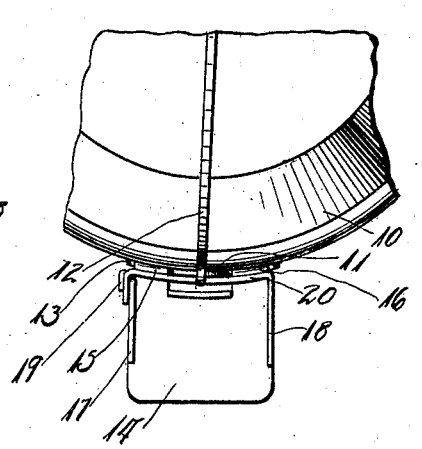

In describing the invention in detail reference will be had to the accompanying drawings wherein like characters of reference denote corresponding parts in the several views; and in which, Figure 1 is a side elevation of a pail with the improved attachment applied thereto, said attachment being shown in supporting position in full lines and in inoperative position in dotted lines; Fig. 2, a front elevation of a fragment of the pail, the attachment in inoperative position; Fig. 3, a fragmental plan view of a pail showing the attachment in supporting position; Fig. 4, a detail perspective view of the attachment showing the manner in which same is formed and assembled from a single piece of metal; and, Fig. 5, a detail perspective view of a modified form of attachment.

Referring to the drawings, 10 represents a milk pail which has secured to the upper edge thereof at diametrically opposite points ears 11 in which are secured respectively the terminals of a bail 12. Rotatably mounted in the lower end of each ear 11 is a rod 13 which is disposed substantially parallel to the upper edge of the pail and extends some distance beyond the side limitations of the ear. Hung from each rod 13 is a supporting member A. This member is constructed from a single piece of metal and comprises a base 14 having formed at its inner end spaced tongues 15 and 16 which are bent around the extensions of the rod 13 so as to complete a pivotal connection between the support A and the ear 11. Bent at an angle to the base 14 are side members 17 and 18, the former of which is provided on its inner end with a tongue 19, while the latter has an extension 20 of considerable length; said extension being provided with an aperture 21 adjacent its free end, and the extension 20, in completing the support is bent at right angles to the side members 17 and 18 and the tongue 19 is passed through the aperture 21 and then bent against said extension. By this construction a support of unusual strength is produced without sacrificing the simplicity of the structure.

In use it will be apparent that the support A is capable only of a limited movement in an upward direction by reason of the fact that when said support is disposed in a plane substantially horizontal to the upper edge of the pail the extension 20 will abut the ear 11 and prevent further upward movement of said support. When in this position the pail can be easily and comfortably suspended upon the knees.

In the modified form shown in Fig. 5, the support comprises angularly disposed portions 22 and 23, the latter of which is provided at its outer edge with tongues 24 and 25 which embrace the extension of the rod 13. In this form of support the upward movement thereof on its pivot is limited by engagement of the portion 23 of the ear 11, such engagement taking place when the portion 22 is disposed in a plane substantially parallel to the upper edge of the pail.

What is claimed is:

The combination with a pail, of an ear secured thereto, a rod rotatably mounted in the lower end of said ear parallel to the top edge of the pail and extending beyond the sides of said ear, and a supporting member formed from a single piece of metal, said member comprising a base having tongues at one end bent around the extending portions of said rod whereby the member is pivotally connected with said ear, side members bent at an angle to said base, one of which is provided with a tongue on its inner end and the other with an extension having an aperture adjacent its free end, said extension being bent transversely of the base and the tongue in the inner end of the side member passed through said aperture whereby the side members are connected together at their inner ends by said extension.

In testimony whereof, I affix my signature, in presence of two witnesses.

LOUIS T. HERBOLD, Jr.

Witnesses:
 H. B. ALLFREE,
 W. C. BERGMAN.